US011648549B2

(12) United States Patent
Bernard et al.

(10) Patent No.: US 11,648,549 B2
(45) Date of Patent: May 16, 2023

(54) ION EXCHANGE SYSTEMS AND METHODS FOR ION EXCHANGING GLASS ARTICLES

(71) Applicant: CORNING INCORPORATED, Corning, NY (US)

(72) Inventors: Richard Wayne Bernard, Corning, NY (US); Tonia Havewala Fletcher, Big Flats, NY (US); Christopher Lee Timmons, Big Flats, NY (US)

(73) Assignee: CORNING INCORPORATED, Corning, NY (US)

( * ) Notice: Subject to any disclaimer, the term of this patent is extended or adjusted under 35 U.S.C. 154(b) by 243 days.

(21) Appl. No.: 16/675,323

(22) Filed: Nov. 6, 2019

(65) Prior Publication Data

US 2020/0171478 A1  Jun. 4, 2020

Related U.S. Application Data

(60) Provisional application No. 62/772,842, filed on Nov. 29, 2018.

(51) Int. Cl.
| | | |
|---|---|---|
| *B01J 47/011* | (2017.01) | |
| *C03C 21/00* | (2006.01) | |
| *B01J 47/018* | (2017.01) | |

(52) U.S. Cl.
CPC ........... *B01J 47/011* (2017.01); *C03C 21/002* (2013.01); *B01J 47/018* (2017.01)

(58) Field of Classification Search
None
See application file for complete search history.

(56) References Cited

U.S. PATENT DOCUMENTS

| | | | | |
|---|---|---|---|---|
| 2,888,495 A | * | 5/1959 | Kissling | C07C 17/38 570/239 |
| 3,336,731 A | * | 8/1967 | Phillips | C01F 7/02 75/677 |
| 3,385,759 A | * | 5/1968 | Bettis | G21C 1/022 976/DIG. 30 |
| 3,395,999 A | | 8/1968 | Lewek | |
| 3,441,398 A | * | 4/1969 | Hess | C03C 21/002 65/30.14 |

(Continued)

FOREIGN PATENT DOCUMENTS

| | | |
|---|---|---|
| AU | 2013211472 B2 | 3/2016 |
| CN | 104310444 A | 1/2015 |

(Continued)

OTHER PUBLICATIONS

Arthur "An investigation into the thermophysical and rheological properties of nanofluids for solar thermal applications" Renewable and Sustainable Energy Reviews 55 (2016) 739-755.

(Continued)

*Primary Examiner* — Chester T Barry
(74) *Attorney, Agent, or Firm* — F. Brock Riggs

(57) ABSTRACT

An ion exchange tank is provided. The ion exchange tank includes a processing chamber and an additive chamber separated by a weir system, the weir system having a flow channel fluidly connecting the processing chamber to the additive chamber, wherein the flow is divided from the additive chamber by a first partition and divided from the processing chamber by a second partition, wherein the additive chamber comprises a solids-absorbing material disposed therein.

14 Claims, 4 Drawing Sheets

(56) References Cited

U.S. PATENT DOCUMENTS

| | | | |
|---|---|---|---|
| 3,711,393 A | | 1/1973 | Garfinkel |
| 3,730,871 A | * | 5/1973 | Boffe .................. C03C 21/005 65/30.14 |
| 3,933,127 A | * | 1/1976 | Arps .................. F22B 1/06 122/1 R |
| 4,689,146 A | * | 8/1987 | Kasai .................. C01G 9/00 210/197 |
| 5,015,288 A | * | 5/1991 | Kusik .................. C22B 9/006 266/159 |
| 5,846,278 A | | 12/1998 | Jantzen et al. |
| 6,190,548 B1 | * | 2/2001 | Frick .................. C02F 3/288 210/252 |
| 6,534,120 B1 | * | 3/2003 | Ozawa .................. G11B 5/8404 427/127 |
| 7,419,530 B2 | | 9/2008 | De Vries et al. |
| 8,551,898 B2 | | 10/2013 | Danielson et al. |
| 8,834,806 B2 | | 9/2014 | Mizrahi |
| 8,956,424 B2 | | 2/2015 | Yang |
| 8,980,777 B2 | | 3/2015 | Danielson et al. |
| 10,202,300 B2 | | 2/2019 | Hart et al. |
| 10,556,826 B2 | | 2/2020 | Amin et al. |
| 2005/0181931 A1 | * | 8/2005 | Mouri .................. B01J 20/28004 502/60 |
| 2009/0241731 A1 | | 10/2009 | Pereira et al. |
| 2012/0210749 A1 | | 8/2012 | Feng et al. |
| 2013/0219965 A1 | * | 8/2013 | Allan .................. C03C 21/002 65/30.14 |
| 2014/0366579 A1 | | 12/2014 | Antoine et al. |
| 2015/0152344 A1 | * | 6/2015 | Gueh .................. C10J 3/86 422/198 |
| 2016/0200629 A1 | | 7/2016 | Ikawa et al. |
| 2017/0282503 A1 | | 10/2017 | Peng et al. |
| 2017/0305788 A1 | | 10/2017 | Nikulin |
| 2018/0148373 A1 | * | 5/2018 | Harris .................. C03C 23/0075 |
| 2018/0327305 A1 | | 11/2018 | Amin et al. |
| 2018/0362399 A1 | | 12/2018 | Amin et al. |
| 2019/0062207 A1 | * | 2/2019 | Jin .................. C11D 7/08 |
| 2020/0102244 A1 | * | 4/2020 | Li .................. C03C 4/18 |
| 2020/0171478 A1 | * | 6/2020 | Bernard .................. C03C 21/002 |

FOREIGN PATENT DOCUMENTS

| | | |
|---|---|---|
| CN | 104445293 A | 3/2015 |
| CN | 105555730 A | 5/2016 |
| CN | 105593177 A | 5/2016 |
| CN | 106629785 A | 5/2017 |
| CN | 107108305 A | 8/2017 |
| CN | 107207315 A | 9/2017 |
| CN | 107311205 A | 11/2017 |
| CN | 108975667 A | 12/2018 |
| CN | 110342834 A | 10/2019 |
| CN | 209612365 U | 11/2019 |
| JP | 2015-151315 A | 8/2015 |
| JP | 6273816 B2 | 2/2018 |
| WO | 2014/045977 A1 | 3/2014 |
| WO | 2015/080095 A1 | 6/2015 |

OTHER PUBLICATIONS

Bartholomew "A Study of the Equilibrium KNO3(I) <> KNO2(I) + 1/2O2 (g) Over the Temperature Range 550-750°" J. Phys. Chem. (1966) 3442-3446.

Freeman "The Kinetics of the Thermal Decomposition of Sodium Nitrate and of the Reaction Between Sodium Nitrite and Oxygen" J. Phys. Chem. 60(11) 1487-1493.

Freeman "The Kinetics of Thermal Decomposition of Potassium Nitrate and of the Reaction Between Potassium Nitrate and Oxygen" J. Am. Chem. Soc. (Feb. 20, 1957) 838-842.

Kramer "Differential Scanning Calorimetry of Sodium and Potassium Nitrates and Nitrites" Thermochimica Acta 55 (1982) 11-17.

Lindauer et al, "Design Construction and Testing of a Large Molten Salt Filter", Oak Ridge National Laboratory (1969).

McCabe et al., "Unit Operations in Chemical Engineering" Fourth Edition 1985 pp. 749-758.

Xiao-Fu et al., "Separation of sodium and potassium using adsorption—elution/crystallization scheme from bittern", Chemical Engineering Research and Design, vol. 161, 2020, pp. 72-81.

Araujo et al; "Ion Exchange Equilibria Between Glass and Molten Salts"; Journal of Non-Crystalline Solids; 318; pp. 262-267 (2003).

International Search Report and Written Opinion of the European International Searching Authority; PCT/US2019/061610; dated Mar. 6, 2020; 12 Pgs.

Chinese Patent Application No. 201980079119.3, Office Action, dated Aug. 17, 2022, 16 pages, (8 pages of English Translation and 8 pages of Original Copy); Chinese Patent Office.

\* cited by examiner

ION EXCHANGE SYSTEMS AND METHODS FOR ION EXCHANGING GLASS ARTICLES

CROSS-REFERENCE TO RELATED APPLICATIONS

This Application claims the benefit of priority under 35 U.S.C § 120 of U.S. Provisional Application Ser. No. 62/772,842 filed on Nov. 29, 2018, the content of which is relied upon and incorporated herein by reference in its entirety.

FIELD

The present disclosure generally relates to ion exchange systems and methods for ion exchanging glass articles and, more specifically, to ion exchange systems having a plurality of chambers.

BACKGROUND

Historically, glass has been used as a preferred material for many applications, including food and beverage packaging, pharmaceutical packaging, kitchen and laboratory glassware, and windows or other architectural features, because of its hermeticity, optical clarity and excellent chemical durability relative to other materials.

However, use of glass for many applications is limited by the mechanical performance of the glass. In particular, glass breakage is a concern, particularly in the packaging of food, beverages, and pharmaceuticals. Breakage can be costly in the food, beverage, and pharmaceutical packaging industries because, for example, breakage within a pharmaceutical filling line may require that neighboring unbroken containers be discarded as the containers may contain fragments from the broken container. Breakage may also require that the filling line be slowed or stopped, lowering production yields. Further, non-catastrophic breakage (i.e., when the glass cracks but does not break) may cause the contents of the glass package or container to lose their sterility which, in turn, may result in costly product recalls.

One root cause of glass breakage is the introduction of flaws in the surface of the glass as the glass is processed and/or during subsequent filling. These flaws may be introduced in the surface of the glass from a variety of sources including contact between adjacent pieces of glassware and contact between the glass and equipment, such as handling and/or filling equipment. Regardless of the source, the presence of these flaws may ultimately lead to glass breakage.

Ion exchange processing is a process used to strengthen glass articles. Ion exchange imparts a compression (i.e., compressive stress) onto the surface of a glass article by chemically replacing smaller ions within the glass article with larger ions from a molten salt bath. The compression on the surface of the glass article raises the mechanical stress threshold to propagate cracks; thereby, improving the overall strength of the glass article. Surface compression and depth of layer are dependent on the ion exchange processing time and temperature. The center tension evolves in the center of the glass thickness to counteract the surface compression. While time and temperature are increased to increase depth of layer, the surface compression decreases over time due to stress relaxation and due to force balance which reduces the strength of the glass article. The combination of the center tension, depth of layer and surface compression can all contribute to the functional performance of the parts.

Generally, a conventional ion exchange process is performed in an ion exchange bath that includes a large tank configured to contain as much as about 30 metric tons of molten salt. During the ion exchange process, solids may be introduced into the bath either as additives that remove impurities present in the bath, that control the bath chemistry (such as the pH of the bath), or that capture byproducts of the ion exchange process to extend the useful life of the salt in the bath. Such solids tend to settle to the bottom of the salt bath and may form regions of the molten salt having an increased concentration of solids. Additionally, the concentration of smaller ions in the ion exchange bath increases while the concentration of larger ions in the ion exchange bath decreases, eventually reaching a condition in which the concentration of larger ions is too low to maintain a high enough concentration in equilibrium with the glass surface, causing the surface compressive stress to fall below a target value. Prior to reaching such concentrations, it is conventional to drain the salt from the ion exchange bath and refill the entire bath with fresh salt. However, the concentration of solids at the bottom of the bath tends to slow the flow of salt, which reduces the ease with which salt may be removed from the bath. This in turn increases the amount of downtime required to refill the bath, which leads to increased costs associated with conventional ion exchange processing.

SUMMARY

According to embodiments of the present disclosure, an ion exchanging tank is provided. The ion exchange tank includes a processing chamber and an additive chamber separated by a weir system, the weir system having a flow channel between two partitions and fluidly connecting the processing chamber to the additive chamber, wherein the flow channel is divided from the additive chamber by a first partition and divided from the processing chamber by a second partition, i.e., the first partition separates the additive chamber from the flow channel and the second partition separates the flow channel from the processing chamber, wherein the additive chamber comprises a solids-absorbing material disposed therein.

According to embodiments of the present disclosure, a method for ion exchanging glass articles is provided. The method includes adding fresh salt and solid additives to an additive chamber of an ion exchange tank, applying heat to the additive chamber to form molten salt, flowing the molten salt out of the additive chamber, through a flow channel of a weir system of the ion exchange tank, and into a processing chamber of the ion exchange tank, and ion exchange processing at least one glass article in the processing chamber, wherein the additive chamber comprises a solids-absorbing material disposed therein.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The disclosure will be understood more clearly from the following description and from the accompanying figures, given purely by way of non-limiting example, in which.

DETAILED DESCRIPTION

As used herein, "have," "having," "include," "including," "comprise," "comprising" or the like are used in their open ended sense, and generally mean "including, but not limited to."

All scientific and technical terms used herein have meanings commonly used in the art unless otherwise specified. The definitions provided herein are to facilitate understanding of certain terms used frequently herein and are not meant to limit the scope of the present disclosure.

The present disclosure is described below, at first generally, then in detail on the basis of several exemplary embodiments. The features shown in combination with one another in the individual exemplary embodiments do not all have to be realized. In particular, individual features may also be omitted or combined in some other way with other features shown of the same exemplary embodiment or else of other exemplary embodiments.

Embodiments of the present disclosure relate to an ion exchange tank having a processing chamber and an additive chamber separated by a weir system. The additive chamber includes a solids-absorbing material and at least one glass article is at least partially immersed in a salt bath within the processing chamber where an ion exchange process is performed. Embodiments of the present disclosure advantageously reduce the concentration of solid additives in the processing chamber where ion exchange processing is performed on glass articles. As such, as compared to tanks used in conventional ion exchange processing, ion exchange tanks as described herein facilitate faster draining and refilling of the processing chamber. Embodiments of the present disclosure also advantageously allow for ion exchange processing to be performed in the processing chamber at the same time that fresh salt is added to the additive chamber and that heat is applied to the additive chamber 106b melt the fresh salt to form molten salt. As compared to tanks used in conventional ion exchange processing where the fresh salt added to the tank must first be heated to form molten salt prior to beginning ion exchange processing, ion exchange tanks as described herein allow for the processing chamber to be filled with molten salt and for the ion exchange process to begin in the processing chamber once the filling of the chamber is complete.

As used herein, the term "conventional ion exchange process" refers to an ion exchange process in which smaller alkali metal ions in a glass article are exchanged for larger alkali metal ions to impart a compressive stress in the glass article, wherein the ion exchange process is carried out for a sequence of glass articles or a sequence of batches of pluralities of glass articles, in the same salt bath.

Figure 1:
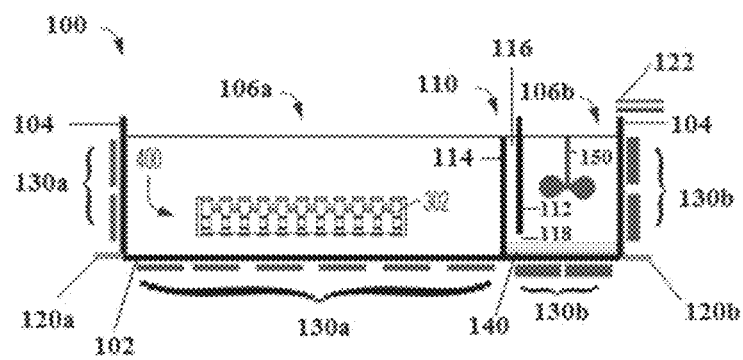
FIG. 1 schematically illustrates an ion exchange tank in accordance with embodiments of the present disclosure.

With reference to FIG. 1, a cross section of an ion exchange tank in accordance with embodiments of the present disclosure is shown. The ion exchange tank 100 includes a bottom 102 and sidewalls 104 which define an interior space 106 configured to hold a molten salt bath. The interior space 106 of the ion exchange tank includes a processing chamber 106a and an additive chamber 106b separated by a weir system 110. As shown, the weir system 110 includes a first partition 112 extending from the top of the tank 100 toward the bottom 102 of the tank 100 and a second partition 114 extending from the bottom 102 of the tank 100 toward the top the tank 100. A flow channel 116 is disposed between the first partition 112 and the second partition 114. The first partition 112 divides the additive chamber 106b from the flow channel 116 and the second partition 114 divides the processing chamber 106a from the flow channel 116. An opening 118 between the second partition 114 and the bottom of the first partition 112 fluidly connects the additive chamber 106b to the flow channel 116 of the weir system 110.

Figure 2:
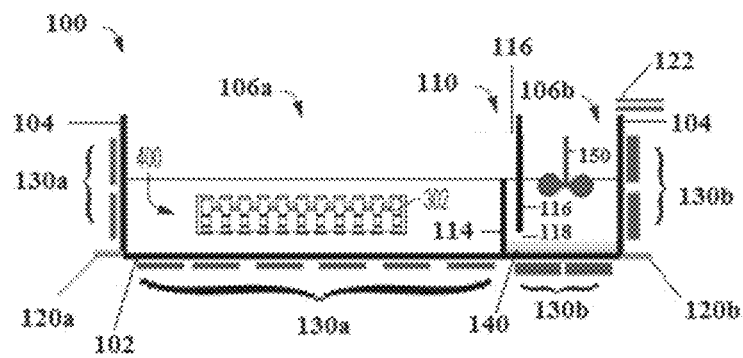
FIG. 2 schematically illustrates an ion exchange tank in accordance with embodiments of the present disclosure.

FIG. 1 illustrates an ion exchange tank 100 including a second partition 114 of the weir system 110 having a height that is substantially similar to the height of the sidewalls 104 of the ion exchange tank 100. However, it should be appreciated that the second partition 114 may have any height such as, for example, any height that is less than the height of the sidewalls 104 of the ion exchange tank 100. FIG. 2 illustrates an ion exchange tank 100 including a second partition 114 of the weir system 110 having a height that is less than the height of the sidewalls 104 of the ion exchange tank 100.

The ion exchange tank 100 may further include an inlet 122 through which fresh salt and/or solid additives may be introduced into the additive chamber 106b. The ion exchange tank 100 may further include a processing chamber outlet 120a through which molten salt may be removed from the processing chamber 106a. The processing chamber outlet 120a may be fluidly connected to the processing chamber 106a via an opening disposed in the bottom 102 of the ion exchange tank 100 within the processing chamber 106a. Alternatively, the opening may be disposed in a sidewall 104 of the ion exchange tank 100 within the processing chamber 106a. Additionally, the system may also include an additive chamber outlet 120b through which the contents of the additive chamber 106b, including solid additives, may be removed from the additive chamber 106b. The additive chamber outlet 120b may be fluidly connected to the additive chamber 106b via an opening disposed in the bottom 102 of the ion exchange tank 100 within the additive chamber 106b. Alternatively, the opening may be disposed in a sidewall 104 of the ion exchange 100 within the additive chamber 106b.

As further shown in FIG. 1, the ion exchange tank 100 as described herein may include a plurality of heating apparatuses 130a, 130b configured to heat the salt bath to an ion exchange temperature, the ion exchange temperature generally being a temperature in which both the first and second metal salts are molten. The ion exchange temperature may be, for example but without limitation, between about 380° C. to about 570° C.; however, it will be appreciated by those skilled in the art that other temperatures may be used. According to embodiments of the present disclosure, first heating apparatus 130a may be positioned and configured to heat the processing chamber 106a and second heating apparatus 130b may be positioned and configured to heat the additive chamber 106b. It is contemplated herein that each of the first heating apparatus 130a and second heating apparatus 130b may include a plurality of heating apparatuses. The first and second heating apparatuses 130a, 130b may have the same operating power or heating apparatus 130a may have a different operating power than heating apparatus 130b. As one non-limiting example, the second heating apparatus 130b may heat the additive chamber 106b to a temperature at which molten salt is formed. In contrast, the first heating apparatus 130a maintain an ion exchange temperature in the processing chamber 106a where the ion exchange temperature is less than the temperature at which molten salt is formed. In such an example, because less energy would be required to maintain the ion exchange temperature, the first heating apparatus 130a, as compared to the second heating apparatus 130b, may be a smaller, less expensive apparatus having a lower operating power. This effectively reduces the overall costs of the ion exchange tank 100 and also leads to a reduction in ion exchange processing costs as compared to a conventional ion exchange process.

The ion exchange tank 100 may further include a solids-absorbing material 140 disposed within the additive chamber 106b. The solids-absorbing material 140 selectively absorbs solids or reduces the concentration of the solids in the additive chamber 106b. In particular, the solids-absorbing material 140 may selectively absorb the solid additives as a result of, for example, reaction of the solids-absorbing material 140 with the solid additives being thermodynamically and/or kinetically more favorable than reaction of the solids-absorbing material with the other salt ions in the additive chamber 106b. The solids-absorbing material 140 may be disposed at or near the bottom of the additive chamber 106b. As the contents of the additive chamber 106b move over the solids-absorbing material 140 and toward the flow channel 116 of the weir system 110, solids are separated from the molten salt and prevented from traveling through the flow channel 116 and into the processing chamber 106a. Optionally, at least a portion of the solids-absorbing material 140 may be disposed in the flow channel 116 of the weir system 110.

Figure 6:
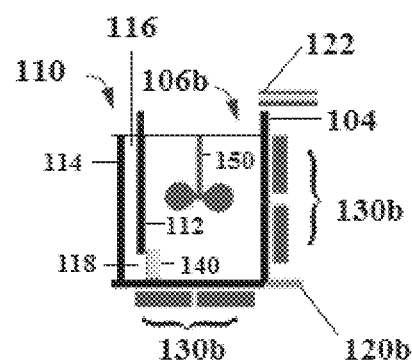
FIG. 6 schematically illustrates a cross-sectional view of an additive chamber of an ion exchange tank in accordance with embodiments of the present disclosure.
Figure 7:
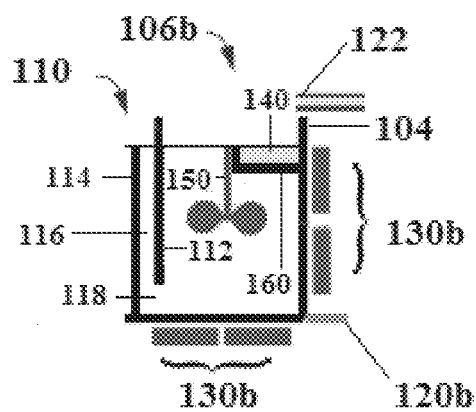
FIG. 7 schematically illustrates a cross-sectional view of an additive chamber of an ion exchange tank in accordance with embodiments of the present disclosure.

As shown in FIG. 1, the solids-absorbing material 140 may be disposed at or near the bottom of the additive chamber 106b. FIG. 6 illustrates an alternative configuration of the additive chamber 106b where the solids-absorbing material 140 is positioned in the opening 118 between the bottom 102 of the ion exchange tank 100 and the first partition 112. As shown in FIG. 7, the additive chamber 106b may further include a porous container 160 where the solids-absorbing material 140 is disposed in the porous container 160. In operation, the contents of the additive chamber 106b may flow through the pores of the porous container 160 to contact the solids-absorbing material 140.

Optionally, the ion exchange system may further include a stirring apparatus 150 disposed in the additive chamber 106b and configured to stir the contents of the additive chamber 106b. The stirring apparatus 150 may advantageously aid in the formation of molten salt and reaction of the molten salt with the solid additives within the additive chamber. The stirring apparatus 150 may also reduce or eliminate stratification, or concentration non-uniformity, of the components of the contents of the additive chamber.

FIG. 1 further illustrates a glass article 302 that may be at least partially immersed in the salt bath within the tank 100. For example, the glass article 302 may be a glass container and, as shown in FIG. 1, may be a plurality of glass containers. Merely for purposes of illustrating the ion exchange tank 100, the glass containers are shown contained in a magazine apparatus 400 which will be described in more detail below. The glass article 302 includes a plurality of substrate metal ions which are alkali metal ions (e.g., $Li^+$, $Na^+$, $K^+$). The salt bath 304 includes a plurality of first metal cations (e.g., $K^+$) at a first metal ion concentration, and a plurality of second metal cations (e.g., $Na^+$) at a second metal ion concentration. The first metal cations and second metal cations may be introduced into the salt bath as first and second metal salts (e.g., $KNO_3$ and $NaNO_3$ respectively).

In operation of the ion exchange tank 100 described herein, fresh salt is introduced into the additive chamber 106b either through the inlet 122 or by being introduced through an opening at the top of the ion exchange tank 100. Similarly, additives as described herein may also be added to the additive chamber either through the inlet 122 or by being introduced through an opening at the top of the ion exchange tank 100. Heat is applied to the additive chamber 106b by heating apparatus 130b to melt the fresh salt and form molten salt. Optionally, a stirring apparatus 150 is operated to stir the contents of the additive chamber 106b.

Due to hydrostatic pressure present in the additive chamber 106b, molten salt is driven from the additive chamber 106b, through opening 118 and along the flow channel 116 of the weir system 110, over the top of the second partition 114 of the weir system 110 and into the processing chamber 106a. In the processing chamber 106a, an ion exchange process is performed in the molten salt bath with at least one glass article 302 in the processing chamber 106b. Due to the solids-absorbing material 140 in the additive chamber 106b, solid additives are retained in the additive chamber 106b and substantially all of the solid additive is prevented from passing through opening 118 and along the flow channel 116 of the weir system 110, over the top of the second partition 114 of the weir system 110 and into the processing chamber 106a.

Generally during ion exchange processing, a glass article 302 is placed in the processing chamber 106a of the ion exchange tank at an ion exchange temperature, for a predetermined period of time, for example, in the range of about 1 hour to about 10 hours. The entire glass article 302, or only a portion of the glass article 302, may be immersed in the molten salt during the ion exchange process. Optionally, a single glass article 302 may be immersed in the molten salt during the ion exchange process, or a plurality of glass articles 302 may be immersed in the molten salt at the same time. Where a plurality of glass articles 302 are processed, the plurality of glass articles 302 may be subdivided into smaller groups, "runs," or lots, which undergo ion exchange in the molten salt in succession.

Glass articles 302 as described herein may be formed from alkali aluminosilicate glass compositions which are amenable to strengthening by ion exchange. Such composition generally includes a combination of $SiO_2$, $Al_2O_3$, at least one alkaline earth oxide, and one or more alkali oxides, such as $Na_2O$ and/or $K_2O$. The glass composition may be free from boron and compounds containing boron. The glass compositions may further comprise minor amounts of one or more additional oxides such as, for example, $SnO_2$, $ZrO_2$, ZnO, $TiO_2$, $As_2O_3$, or the like. These components may be added as fining agents and/or to further enhance the chemical durability of the glass composition. For example, glass articles as described herein my be formed from the ion exchangeable glass composition described in granted U.S. Pat. No. 8,980,777 filed Oct. 25, 2012 entitled "Glass Compositions with Improved Chemical and Mechanical Durability" the contents of which are incorporated herein by reference in their entirety.

Exemplarily glass compositions that glass articles 302 as described herein may be formed from include glass compositions which meet the criteria for pharmaceutical glasses described by regulatory agencies such as the USP (United States Pharmacopoeia), the EP (European Pharmacopoeia), and the JP (Japanese Pharmacopeia) based on their hydrolytic resistance. Per USP 660 and EP 7, borosilicate glasses meet the Type I criteria and are routinely used for parenteral packaging. Examples of borosilicate glass include, but are not limited to Corning® Pyrex® 7740, 7800 and Wheaton 180, 200, and 400, Schott Duran, Schott Fiolax, KIMAX® N-51A, Gerrescheimer GX-51 Flint and others. Soda-lime glass meets the Type III criteria and is acceptable in packaging of dry powders which are subsequently dissolved to make solutions or buffers. Type III glasses are also suitable for packaging liquid formulations that prove to be insensitive to alkali. Examples of Type III soda lime glass include Wheaton 800 and 900. De-alkalized soda-lime glasses have higher levels of sodium hydroxide and calcium oxide and meet the Type II criteria. These glasses are less resistant to leaching than Type I glasses, but more resistant than Type III glasses. Type II glasses can be used for products that remain below a pH of 7 for their shelf life. Examples include ammonium sulfate treated soda lime glasses. These pharmaceutical glasses have varied chemical compositions and have a coefficient of linear thermal expansion (CTE) in the range of $20\text{-}85\times10^{-7}\,°\text{C}.^{-1}$.

Generally, the molten salt bath may include a first cation and a second cation wherein the first cation is larger than the second cation. At the beginning of the ion exchange process, the bath may include only the first cation. Optionally, the second cation may be intentionally included in the bath at the beginning of the ion exchange process. In either case, the second cation is introduced into the bath during the ion exchange process. The ion exchange bath may include, for example, a potassium salt such as potassium nitrate ($KNO_3$) and a small amount of the corresponding sodium salt ($NaNO_3$), which may be present as a contaminant or intentionally added to the bath, with the K+ ion being the first cation and the Na+ ion being the second cation. After the ion exchange is considered to be complete the glass article 302 is removed and washed to remove excess salt from the ion exchange bath. This process is repeated for additional glass articles in the same ion exchange bath until the salt in the ion exchange bath no longer provides a high enough surface concentration to achieve a CS above a targeted CS, a CT above a targeted CT, or a DOL above the targeted DOL. As ion exchange processing is performed on each glass article 302, the concentration of smaller cations in the ion exchange bath increases while the concentration of larger cations in the ion exchange bath decreases, eventually reaching a concentration in which too few larger cations are available to be exchanged for the smaller cations in the glass article. This phenomenon is referred to as "poisoning" of the bath. As used herein, the terms "poisoning ions" and "poisoning cations" refer to the smaller cations that leave the glass and enter the ion exchange/salt bath during the ion exchange process and "poisoning salt" refers to the salts of such cations. The increase in concentration of poisoning cations as ion exchange progresses causes gradual deterioration of the CS, CT and DOL over time for glass articles that are subsequently ion exchanged in the same salt bath. Prior to reaching a concentration in which too few larger cations are available to be exchanged for the smaller ions in the glass article, the entire contents of the ion exchange bath may be replaced.

Figure 4:
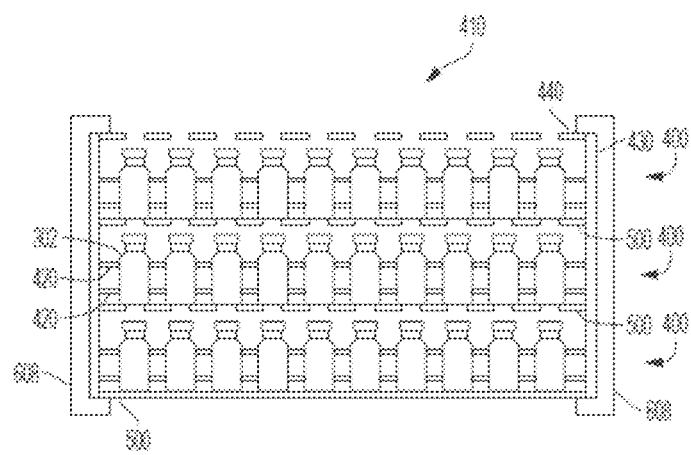
FIG. 4 schematically illustrates a cross-sectional view of a cassette assembly in accordance with embodiments of the present disclosure.

As described above, FIG. 4, schematically depicts a cross-sectional view of a cassette assembly 410 which may include a plurality of magazine apparatuses 400 stacked adjacently and secured together in a cassette 608. The magazine apparatuses 400 are configured to retain glass articles 302, such as glass vials, during ion exchange processing while allowing for acceptable levels of fluid contact by the molten salt in the processing chamber 106a with all areas (interior and exterior) of the glass articles 302 when the magazine apparatus 400 is partially or fully submerged in the molten salt. Each magazine apparatus 400 generally includes a bottom support floor 500, a plurality of glassware-securing members 420, a cover plate 440 and vertical supports 430 that securely connect the bottom support floor 500, the glassware-securing members 420, and may removably secure the cover plate 440.

According to embodiments of the present disclosure, the operation of the ion exchange tank 100 described herein may further include recirculating salt from the processing chamber 106a of the ion exchange tank 100. Dragout, or salt which adheres to the surface of the glass article 302, or to the surface of any fixture or carrier which contacts the glass article 302 in the ion exchange tank 100, exits the molten salt bath when the glass article 302 and/or the fixture or carrier is removed from the ion exchange tank 100. Dragout is conventionally washed off the glass article 302 and/or the fixtures without being recirculated.

Figure 5:
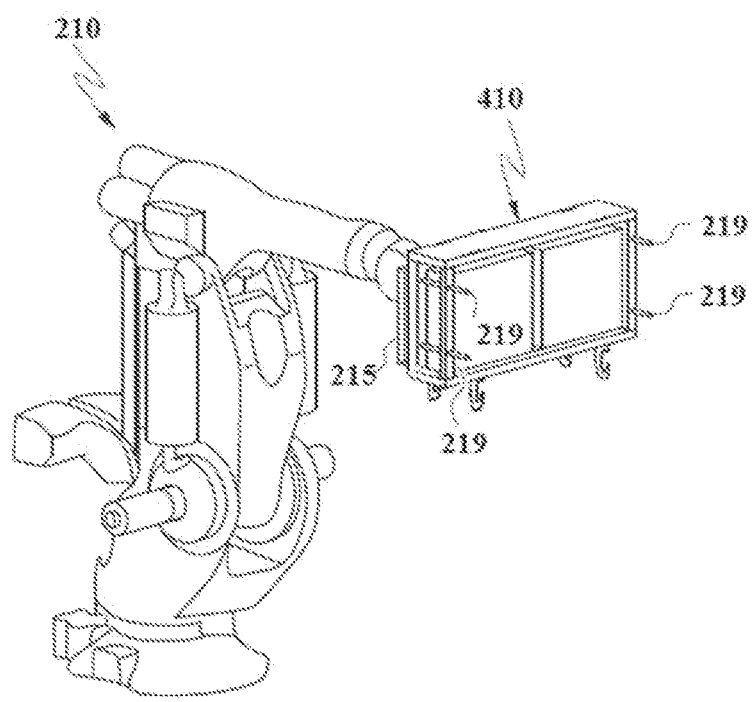
FIG. 5 illustrates a robotic lift system with a rotation tool in accordance with embodiments of the present disclosure.

However, according to embodiments of the present disclosure, a robotic lift system 210 including a rotation tool 215 may be configured to move the glass article 302 and/or the fixture or carrier out of the processing chamber 106a to a position over the additive chamber 106b. The rotation tool 215 may include engagement features, such as a plurality of prongs 219 as shown in FIG. 5, which are configured to engage with a portion of the magazine apparatus 400 so that the magazine apparatus 400 can be rotated. Thus, in operation, the robotic lift system 210 may be controlled to mount the magazine apparatus 400 onto the rotation tool 215. The rotation tool 215 may be motorized such that the rotation tool 215 can perform a rotation sequence to substantially drain the magazine apparatus 400 of molten salt into the additive chamber 106b.

Figure 3:
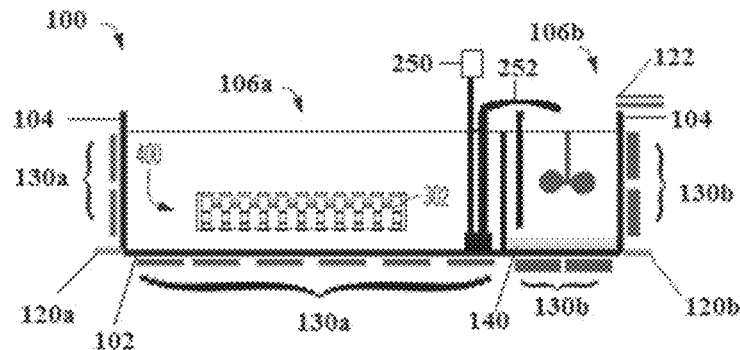
FIG. 3 schematically illustrates an ion exchange tank in accordance with embodiments of the present disclosure.

FIG. 3 illustrates an ion exchange tank 100 in accordance with embodiments of the present disclosure. As shown in FIG. 3, the ion exchange tank 100 may include a pump device 250 configured to transfer molten salt from the processing chamber 106a to the additive chamber 106b. In operation, molten salt is recirculated from the processing chamber 106a by way of the pump device 250. According to embodiments of the present disclosure, the molten salt may be circulated continuously. Alternatively, the molten salt may be circulated at predetermined intervals for predetermined periods of time. As shown in FIG. 3, molten salt is pumped by way of the pump device 250 out of the processing chamber 106a, over the top of the weir system 110, and into the additive chamber 106b. As an alternative, the processing chamber 106a may be fluidly connected via a pipe to the additive chamber 106b and the pump device 250 may be configured to pump molten salt from a recirculation outlet (not shown) in the processing chamber 106a, through the pipe, and into the additive chamber 106b.

According to the embodiments of the present disclosure, ion exchange processing may be performed in the processing chamber 106a at the same time that fresh salt is added to the additive chamber 106b and that heat is applied to the additive chamber 106b melt the fresh salt and form molten salt. As compared to tanks used in conventional ion exchange processing where the fresh salt added to the tank must first be heated to form molten salt prior to beginning ion exchange processing, ion exchange tanks as described herein allow for the processing chamber 106a to be filled with molten salt and for the ion exchange process to begin once the filling of the chamber 106a is complete.

According to embodiments of the present disclosure, molten salt in the processing chamber 106a may be drained through processing chamber outlet 120a while the contents of the additive chamber 106b remain unaltered. Because solid additives are confined to the additive chamber 106b of the ion exchange tank described herein, embodiments of the present disclosure prevent a concentration of solids forming at the bottom of the tank, such as frequently occurs in conventional ion exchange processing, which in turn facilitates faster draining and refilling of the processing chamber 106a than in tanks used in conventional ion exchange processing. The additive chamber 106b may also be drained through additive chamber outlet 120b. Because the processing chamber 106a and the additive chamber 106b are drained through separate outlets, the chambers may be drained with different frequencies and at different times.

While the present disclosure includes a limited number of embodiments, those skilled in the art, having benefit of this disclosure, will appreciate that other embodiments can be devised which do not depart from the scope of the present disclosure.

What is claimed is:

1. An ion exchange tank comprising:
a bottom and sidewalls that define an interior space configured to hold a molten salt bath, the interior space comprising a processing chamber and an additive chamber separated by a weir system, the weir system comprising a flow channel fluidly connecting the processing chamber to the additive chamber,
wherein the flow channel is divided from the additive chamber by a first partition and divided from the processing chamber by a second partition,
wherein the additive chamber comprises a solids-absorbing material disposed therein, the solids-absorbing material comprising a material that selectively absorbs solids from molten salt in the additive chamber, and
wherein the ion exchange tank is configured for performing an ion exchange process on a glass article at least partially immersed in a salt bath within the processing chamber.

2. The ion exchange tank of claim 1, wherein the solids-absorbing material is disposed at the bottom of the additive chamber.

3. The ion exchange tank of claim 1, wherein the solids-absorbing material is disposed in an opening between the additive chamber and the flow channel of the weir system.

4. The ion exchange tank of claim 1, further comprising a porous container wherein the solids-absorbing material is disposed in the porous container and wherein molten salt in the additive chamber flows through pores of the porous container to contact the solids-absorbing material.

5. The ion exchange tank of claim 1, further comprising a processing chamber outlet in the processing chamber and an additive chamber outlet in the additive chamber.

6. The ion exchange tank of claim 1, further comprising a first heating apparatus external to the processing chamber and positioned to heat the processing chamber and a second heating apparatus external to the additive chamber and positioned to heat the additive chamber.

7. The ion exchange tank of claim 6, wherein the first heating apparatus has a lower operating power than the second heating apparatus.

8. The ion exchange tank of claim 6, comprising a plurality of first heating apparatuses and a plurality of second heating apparatuses.

9. The ion exchange tank of claim 1, further comprising a stirring apparatus disposed in the additive chamber, the stirring apparatus being configured to stir the contents of the additive chamber.

10. The ion exchange tank of claim 1, wherein the second partition of the weir system comprises a height substantially equal to the height of sidewalls of the ion exchange tank.

11. The ion exchange tank of claim 10, wherein the second partition of the weir system comprises a height that is less than the height of sidewalls of the ion exchange tank.

12. The ion exchange tank of claim 1, further comprising a pump device configured to pump salt from the processing chamber to the additive chamber.

13. The ion exchange tank of claim 1, comprising a glass article at least partially immersed in a salt bath within the processing chamber.

14. The ion exchange tank of claim 13, wherein the glass article comprises a glass container.

\* \* \* \* \*